(12) United States Patent
Uramoto et al.

(10) Patent No.: US 9,424,985 B2
(45) Date of Patent: Aug. 23, 2016

(54) FEED UNIT AND FEED SYSTEM

(71) Applicant: Sony Corporation, Tokyo (JP)

(72) Inventors: Yoichi Uramoto, Kanagawa (JP); Masayuki Tanaka, Kanagawa (JP); Osamu Kozakai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 494 days.

(21) Appl. No.: 13/926,420

(22) Filed: Jun. 25, 2013

(65) Prior Publication Data

US 2014/0035364 A1    Feb. 6, 2014

(30) Foreign Application Priority Data

Jul. 31, 2012    (JP) ................... 2012-169217

(51) Int. Cl.
| | |
|---|---|
| *H01F 27/42* | (2006.01) |
| *H01F 38/14* | (2006.01) |
| *H02J 5/00* | (2016.01) |
| *H02J 7/02* | (2016.01) |
| *H02J 17/00* | (2006.01) |

(52) U.S. Cl.
CPC ............... *H01F 38/14* (2013.01); *H02J 5/005* (2013.01); *H02J 7/025* (2013.01); *H02J 17/00* (2013.01); *Y10T 307/297* (2015.04)

(58) Field of Classification Search
CPC ........... H01F 38/14; H02J 5/005; H02J 7/025; H02J 17/00; Y10T 307/297
USPC ........................................................ 307/104
See application file for complete search history.

(56) References Cited

U.S. PATENT DOCUMENTS

| | | | | |
|---|---|---|---|---|
| 5,475,580 A | * | 12/1995 | Noro ..................... | H02M 3/337 363/134 |
| 2008/0197802 A1 | * | 8/2008 | Onishi .................... | H02J 5/005 320/106 |
| 2012/0038317 A1 | * | 2/2012 | Miyamoto .............. | H02J 7/025 320/108 |
| 2012/0127214 A1 | * | 5/2012 | Han ....................... | G09G 3/342 345/690 |
| 2013/0334896 A1 | * | 12/2013 | Yamamoto ............ | B60L 11/182 307/104 |

FOREIGN PATENT DOCUMENTS

| | | |
|---|---|---|
| JP | 2001-102974 | 4/2001 |
| JP | 2002-034169 | 1/2002 |
| JP | 2005-110399 | 4/2005 |
| JP | 2008-206233 | 9/2008 |
| JP | 2010-063245 | 3/2010 |
| WO | WO-00/27531 | 5/2000 |

* cited by examiner

*Primary Examiner* — Jared Fureman
*Assistant Examiner* — Duc M Pham
(74) *Attorney, Agent, or Firm* — Chip Law Group

(57) ABSTRACT

A feed unit includes: a power transmission coil provided to perform power transmission with use of a magnetic field; a parallel LC resonance circuit including the power transmission coil; a series LC resonance circuit; an alternating-current signal generating section supplying the parallel LC resonance circuit and the series LC resonance circuit with an alternating-current signal used to perform the power transmission; and a control section controlling the alternating-current signal generating section with use of a predetermined control signal, the control section performing frequency control of the control signal to allow a circuit current that flows upon the power transmission to become smaller.

12 Claims, 12 Drawing Sheets

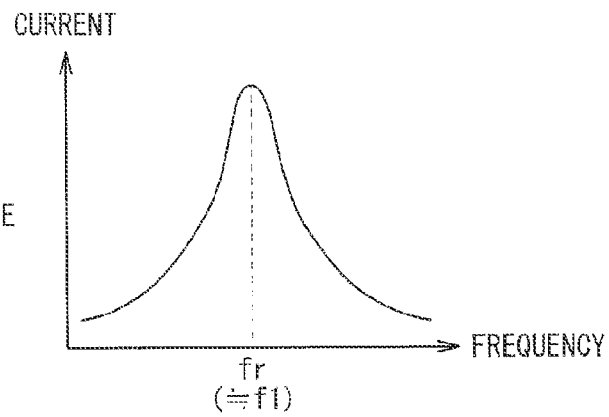
FIG. 6A SERIES RESONANCE
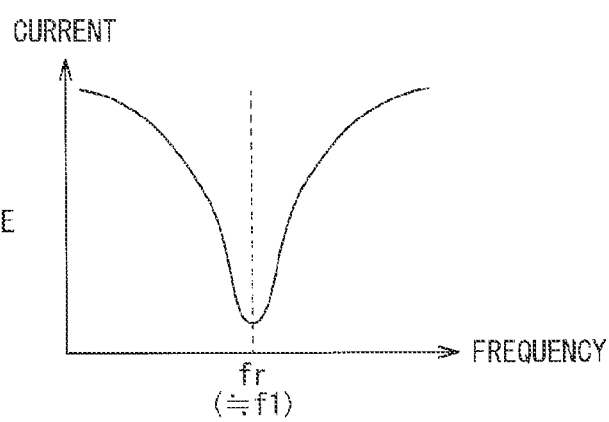
FIG. 6B PARALLEL RESONANCE
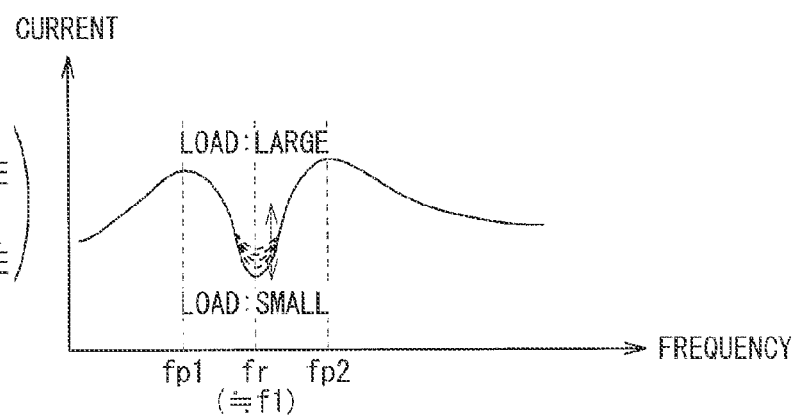
FIG. 6C (SERIES RESONANCE + PARALLEL RESONANCE)

FEED UNIT AND FEED SYSTEM

BACKGROUND

The disclosure relates to a feed system that performs non-contact electric power supply (power transmission) to a device to be fed such as an electronic device. The disclosure also relates to a feed unit applied to such a feed system.

In recent years, attention has been given to a feed system (such as a non-contact feed system and a wireless charging system) that performs non-contact electric power supply (power transmission) to a CE device (Consumer Electronics Device) such as a portable telephone and a portable music player. This makes it possible to start charging merely by placing an electronic device (a secondary-side device) on a charging tray (a primary-side device), instead of starting charging by inserting (connecting) a connector of a power-supply unit such as an AC adapter into the device. In other words, terminal connection between the electronic device and the charging tray becomes unnecessary.

As a method of thus performing non-contact power supply, an electromagnetic induction method is well known. In recent years, a non-contact feed system using a method called a magnetic resonance method utilizing an electromagnetic resonance phenomenon has also been receiving attention. Such non-contact feed systems are disclosed in WO 00/027531, as well as Japanese Unexamined Patent Application Publication Nos. 2001-102974, 2008-206233, 2002-34169, 2005-110399, and 2010-63245, for example.

SUMMARY

Meanwhile, in non-contact feed systems like those described above, in general, transmission efficiency at the time of feeding is desired to be enhanced.

It is desirable to provide a feed unit and a feed system that are capable of enhancing transmission efficiency at the time of performing electric power transmission using a magnetic field.

According to an embodiment of the disclosure, there is provided a feed unit including: a power transmission coil provided to perform power transmission with use of a magnetic field; a parallel LC resonance circuit including the power transmission coil; a series LC resonance circuit; an alternating-current signal generating section supplying the parallel LC resonance circuit and the series LC resonance circuit with an alternating-current signal used to perform the power transmission; and a control section controlling the alternating-current signal generating section with use of a predetermined control signal, the control section performing frequency control of the control signal to allow a circuit current that flows upon the power transmission to become smaller.

According to an embodiment of the disclosure, there is provided a feed system including: one or a plurality of electronic devices, and a feed unit performing power transmission to each of the electronic devices with use of a magnetic field. The feed unit includes: a power transmission coil provided to perform the power transmission; a parallel LC resonance circuit including the power transmission coil; a series LC resonance circuit; an alternating-current signal generating section supplying the parallel LC resonance circuit and the series LC resonance circuit with an alternating-current signal used to perform the power transmission; and a control section controlling the alternating-current signal generating section with use of a predetermined control signal, the control section performing frequency control of the control signal to allow a circuit current that flows upon the power transmission to become smaller.

In the feed unit and the feed system according to the embodiments of the disclosure, the AC (alternating-current) signal generating section that supplies the AC signal for performing power transmission with respect to the parallel LC resonance circuit and the series LC resonance circuit using the power transmission coil is controlled using the predetermined control signal. In this control, the frequency control of the control signal is performed to allow the circuit current flowing upon the power transmission to become smaller. This makes it easy to suppress the circuit current to a low level, even when, for example, frequency characteristics change in accordance with variations in element characteristics and variation in a load.

According to the feed unit and the feed system according to the embodiments of the disclosure, the frequency control of the control signal for the AC signal generating section is performed to allow the circuit current flowing upon the power transmission to become smaller. Therefore, it is easy to suppress the circuit current to a low level. Therefore, transmission efficiency upon performing electric power transmission using a magnetic field is allowed to be enhanced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to describe the principles of the technology.

FIGS. 6A to 6C are schematic diagrams each illustrating an example of a relationship between each resonance operation and frequency characteristics of a current.

DETAILED DESCRIPTION

An embodiment of the present disclosure will be described below in detail with reference to the drawings. It is to be noted that the description will be provided in the following order.
1. Embodiment (an example of performing both frequency control and duty-ratio control of a control signal)
2. Modifications
   Modification 1 (an example of performing only frequency control of a control signal)
   Modification 2 (an example in which an intermediate coil for voltage transformation is provided in a feed unit)
3. Other modifications Embodiment

[Overall Configuration of Feed System 4]

Figure 1:
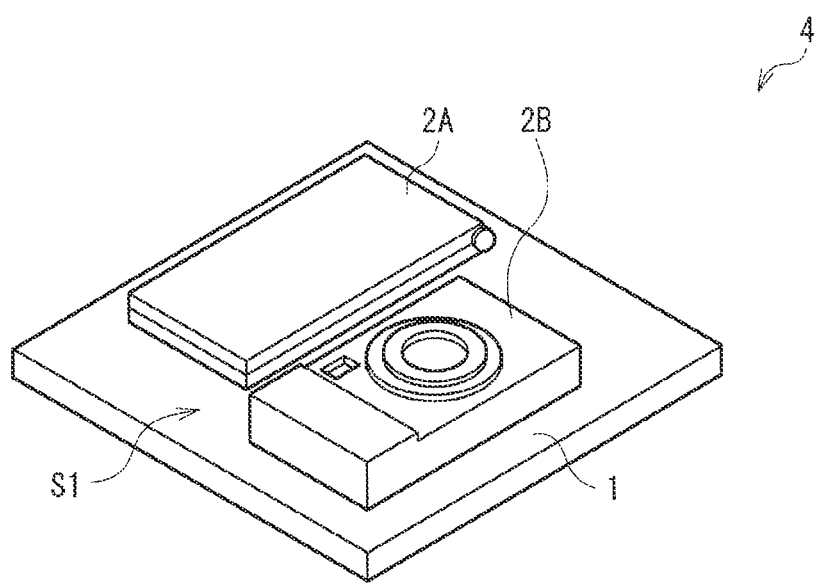
FIG. 1 is a perspective view illustrating an appearance configuration example of a feed system according to an embodiment of the present disclosure.
Figure 2:
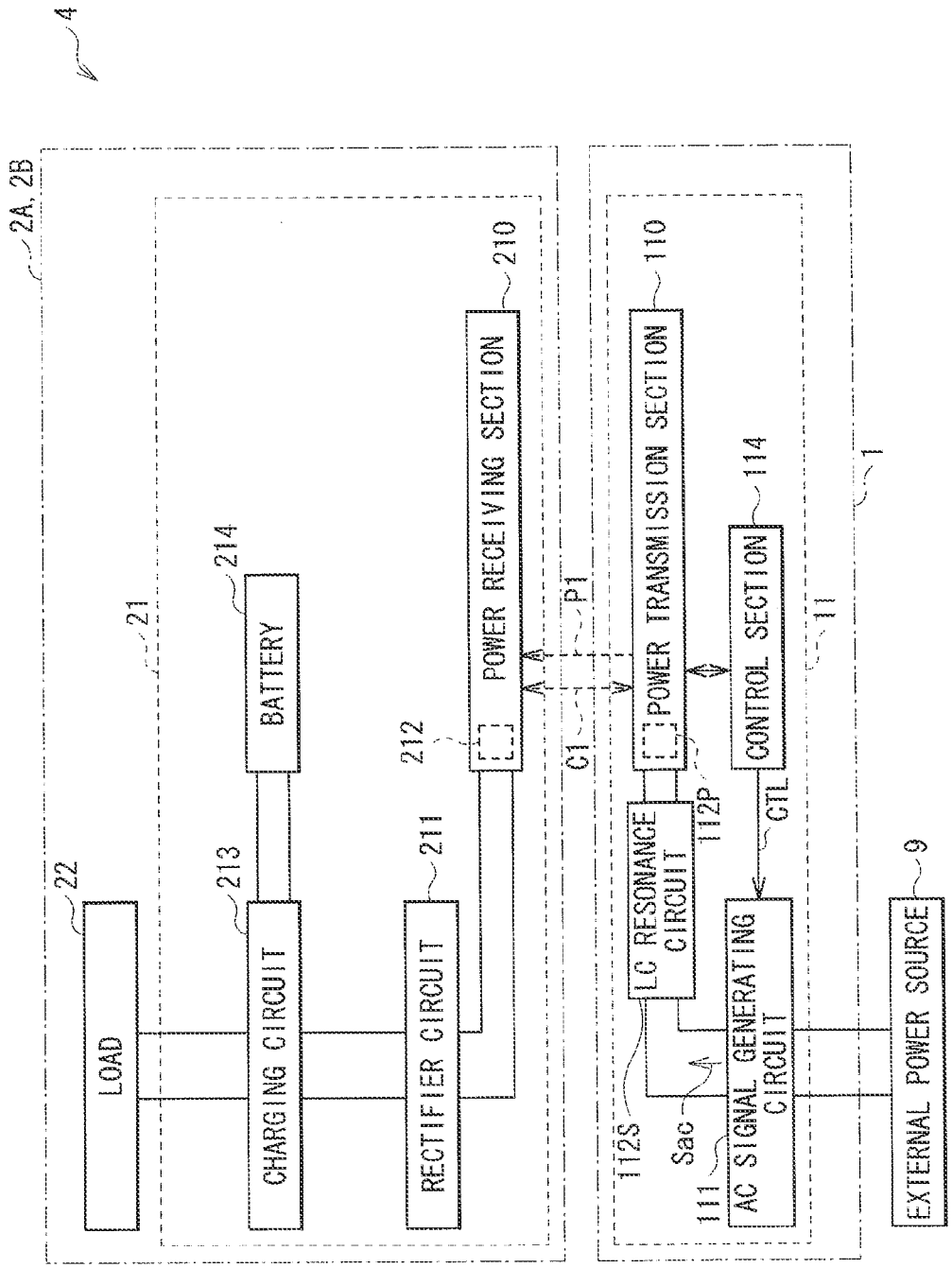
FIG. 2 is a block diagram illustrating a detailed configuration example of the feed system illustrated in FIG. 1.

FIG. 1 illustrates an appearance configuration example of a feed system (a feed system 4) according to an embodiment of the present disclosure, and FIG. 2 illustrates a block configuration example of the feed system 4. The feed system 4 is a system (non-contact type feed system) that performs electric power transmission (power supply, feeding, or power transmission) in a non-contact manner by using a magnetic field (by utilizing magnetic resonance, electromagnetic induction, or the like; likewise hereinafter). The feed system 4 includes a feed unit 1 (a primary-side device) and a plurality of electronic devices (here, two electronic devices 2A and 2B; secondary-side devices) each serving as a device to be fed.

In the feed system 4, electric power transmission from the feed unit 1 to the electronic devices 2A and 2B may be performed by placing the electronic devices 2A and 2B on (or, in proximity to) a feeding surface (a power transmission surface) S1 in the feed unit 1, as illustrated in FIG. 1, for example. Here, in consideration of a case where the electric power transmission to the electronic devices 2A and 2B is performed simultaneously or time-divisionally (sequentially), the feed unit 1 is shaped like a mat (a tray) in which the area of the feeding surface S1 is larger than the electronic devices 2A and 2B to be fed and the like.

(Feed Unit 1)

The feed unit 1 is a unit (a charging tray) that performs the electric power transmission to the electronic devices 2A and 2B by using a magnetic field as described above. The feed unit 1 may include, for example, a power transmission unit 11. The power transmission unit 11 may include a power transmission section 110, an AC (alternating-current) signal generating circuit (an AC signal generating section, or a high-frequency power generating circuit) 111, an LC resonance circuit 112S, and a control section 114 (a transmission control section), as illustrated in FIG. 2, for example. The power transmission section 110 includes an LC resonance circuit 112P. In addition, in the power transmission unit 11, a current detection section (current detection sections 113A and 113B that will be described later) which is not illustrated is provided.

The power transmission section 110 may include, for example, a power transmission coil (a primary-side coil) L1$p$, a capacitor C1$p$ (a capacitor for resonance) described later, and the like. As will be described later, the LC resonance circuit 112P is configured using the power transmission coil L1$p$ and the capacitor C1$p$. The power transmission section 110 performs electric power transmission (power transmission) using an alternating magnetic field to the electronic devices 2A and 2B (specifically, a power receiving section 210 that will be described later), by utilizing the power transmission coil L1$p$ and the capacitor C1$p$ (see an arrow P1 in FIG. 2). Specifically, the power transmission section 110 has a function of emitting a magnetic field (a magnetic flux) from the feeding surface S1 toward the electronic devices 2A and 2B. The power transmission section 110 also has a function of performing predetermined mutual communication operation with the power receiving section 210 described later (see an arrow C1 in FIG. 2).

The AC signal generating circuit 111 may be, for example, a circuit that generates a predetermined AC signal Sac (high-frequency electric power) used to perform power transmission, by using electric power supplied from an external power source 9 (a host power source) of the feed unit 1. The AC signal Sac is supplied to the LC resonance circuits 112P and 112S as will be described later. The AC signal generating circuit 111 described above may be configured using, for example, a switching amplifier that will be described later. It is to be noted that examples of the external power source 9 may include an ordinary AC adapter, and a USB (Universal Serial Bus) 2.0 power source (power supply ability: 500 mA, and power supply voltage: about 5 V) provided in a PC (Personal Computer) etc.

The LC resonance circuit 112S is provided on a path between the AC signal generating circuit 111 and the power transmission section 110 (the LC resonance circuit 112P), and configured using a coil L1$s$ and a capacitor C1$s$ (a capacitor for resonance) that will be described later.

The control section 114 performs various kinds of control operation in the entire feed unit 1 (the entire feed system 4). Specifically, other than controlling the power transmission (power transmission operation) and the communication (communication operation) by the power transmission section 110, the control section 114 may have, for example, a function of controlling optimization of the transmitted electric power and authenticating the secondary-side device. The control section 114 further has a function of determining that the secondary-side device is on the primary-side device, a function of detecting a mixture such as dissimilar metal, etc. Here, when performing the above-mentioned control of the power transmission, the control section 114 controls operation of the AC signal generating circuit 111 by using a predetermined control signal CTL (a control signal for the power transmission) described later. Further, the control section 114 also has a function of performing modulation processing based on pulse width modulation (PWM) described later, by using the control signal CTL.

Furthermore, the control section 114 has a function of performing frequency control of the above-described control signal CTL so that a circuit current (a current flowing through the power transmission coil L1$p$ and the like) that flows upon the power transmission becomes smaller. In addition, the control section 114 has a function of controlling a duty ratio Duty of the control signal CTL by utilizing communication with the electronic devices 2A and 2B described later. The control section 114 as described above may be configured using, for example, a microcomputer, a pulse generator, or the like. It is to be noted that the control operation (the frequency control, and the duty-ratio control) of the control signal CTL by the control section 114 will be described later in detail.

(Electronic Devices 2A and 2B)

The electronic devices 2A and 2B each may be, for example, any of stationary electronic devices represented by television receivers, portable electronic devices containing a rechargeable battery represented by portable telephones and digital cameras, and the like. As illustrated in, for example, FIG. 2, the electronic devices 2A and 2B each include a power receiving unit 21, and a load 22 that performs predetermined operation (operation of performing functions of serving as the electronic device) based on electric power supplied from the power receiving unit 21. Further, the power receiving unit 21 includes a power receiving section 210, a rectifier circuit 211, a charging circuit 213, and a battery 214. The power receiving section 210 includes an LC resonance circuit 212.

The power receiving section 210 may include, for example, a power receiving coil L2 (a secondary-side coil) and a capacitor C2 (a capacitor for resonance) which will be described later, and the like. The LC resonance circuit 212 is configured using the power receiving coil L2 and the capacitor C2 as will be described later. The power receiving section 210 has a function of receiving electric power (transmitted electric power) transmitted from the power transmission section 110 in the feed unit 1, by utilizing, for example, the power receiving coil L2, the capacitor C2, and the like. The power receiving section 210 also has a function of performing the above-mentioned predetermined mutual communication operation between the power receiving section 210 and the power transmission section 110 (see the arrow C1 in FIG. 2).

The rectifier circuit 211 is a circuit that rectifies the transmitted electric power (AC power) supplied from the power receiving section 210, and generates DC (direct current) power.

The charging circuit 213 is a circuit used to charge the battery 214, based on the DC power supplied from the rectifier circuit 211.

The battery 214 stores electric power according to the charging by the charging circuit 213, and may be configured using, for example, a rechargeable battery (a secondary battery) such as a lithium ion battery.

[Detailed Configuration of Feed Unit 1 as well as Electronic Devices 2A and 2B]

Figure 3:
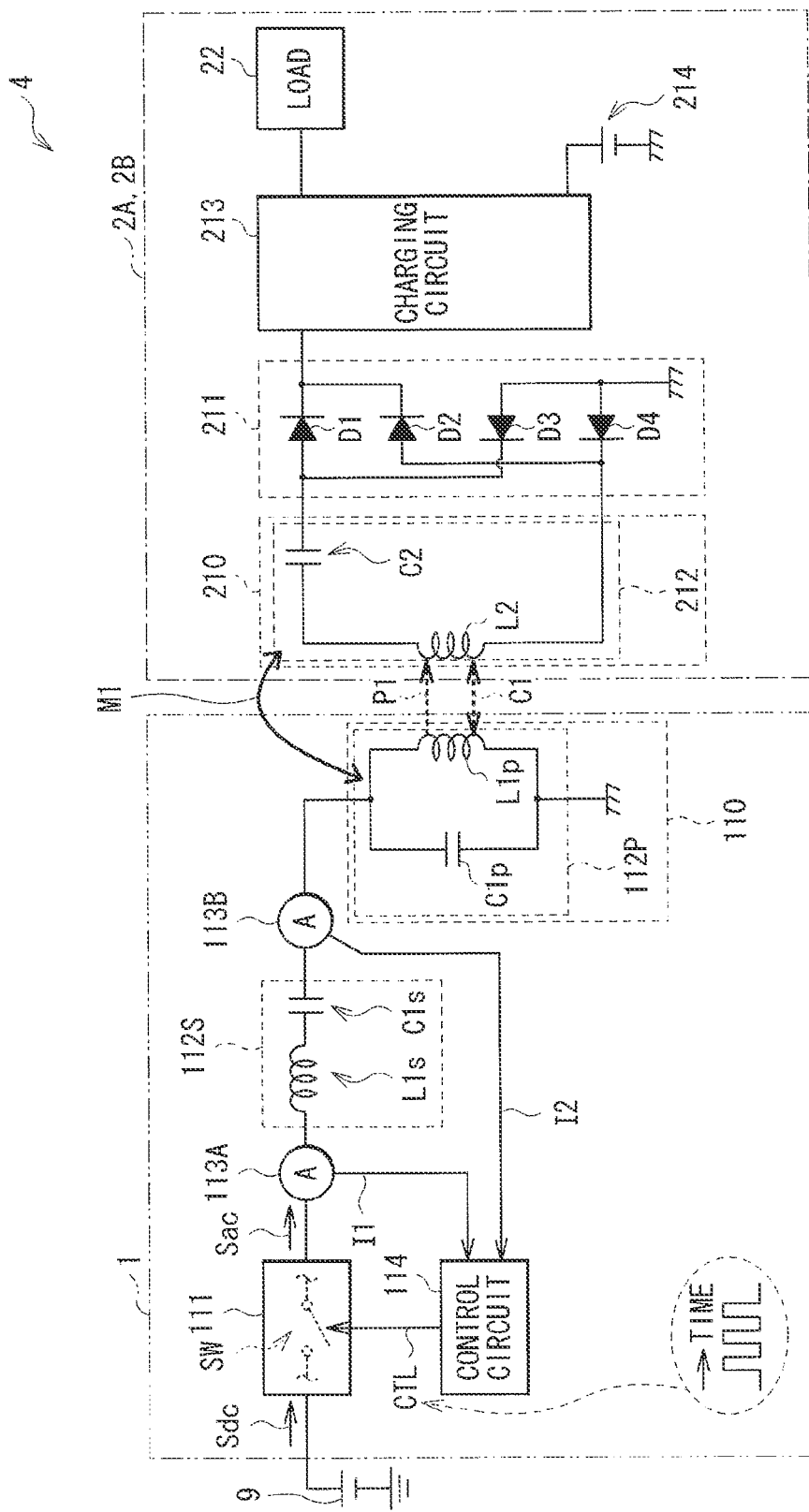
FIG. 3 is a circuit diagram illustrating a detailed configuration example of each block illustrated in FIG. 2.

FIG. 3 illustrates a detailed configuration example of each block in the feed unit 1 as well as the electronic devices 2A and 2B illustrated in FIG. 2, by using a circuit diagram.

(Power Transmission Section 110 and LC Resonance Circuit 112P)

The power transmission section 110 includes the power transmission coil L1p used to perform the electric power transmission (to generate a magnetic flux) by using a magnetic field. The power transmission section 110 further includes the capacitor C1p used to form the above-described LC resonance circuit 112P together with the power transmission coil L1p. The power transmission coil L1p and the capacitor C1p are electrically connected to each other in parallel. Respective one ends of the power transmission coil L1p and the capacitor C1p are connected to each other on the LC resonance circuit 112S side, and respective other ends thereof are grounded. In other words, the LC resonance circuit 112P functions as a parallel LC resonance circuit. It is to be noted that the LC resonance circuit 112P is set so that a Q value is relatively higher.

Further, the LC resonance circuits 112S and 112P, and the LC resonance circuit 212 including the power receiving coil L2 and the capacitor C2 described later are magnetically coupled to each other (see mutual induction M1 and the like illustrated in FIG. 3). Thus, LC resonance operation that is based on resonant frequency substantially equal to the high-frequency electric power (the AC signal Sac) generated by the AC signal generating circuit 111 is performed.

(AC Signal Generating Circuit 111)

Figure 4:
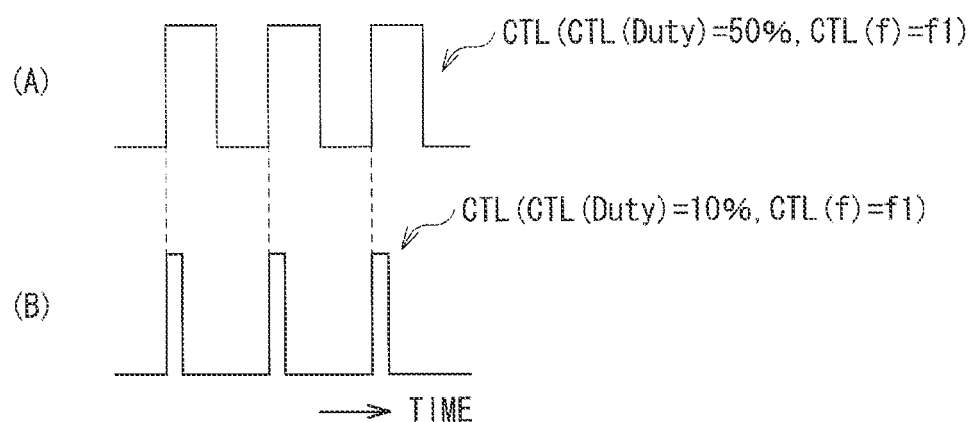
FIG. 4 is a timing waveform diagram illustrating an example of a control signal for an AC signal generating circuit.

The AC signal generating circuit 111 may be configured using the switching amplifier (not illustrated; a so-called class E amplifier, a differential amplifier, or the like) including one or a plurality of switching elements SW formed by MOS (Metal Oxide Semiconductor) transistors and/or the like. The control signal CTL for the power transmission is supplied from the control section 114 to the AC signal generating circuit 111. The control signal CTL may be, for example, a pulse signal having a predetermined frequency f (CTL(f)=f1) and a duty ratio Duty (CTL(Duty)=10%, 50%, and so on) as illustrated in FIG. 3 as well as Parts (A) and (B) of FIG. 4. Further, the pulse width modulation described later is performed by controlling the duty ratio Duty of the control signal CTL as illustrated in, for example, Parts (A) and (B) of FIG. 4.

In the AC signal generating circuit 111 having such a configuration, the above-described switching element SW performs ON/OFF operation (switching operation including the frequency f and the duty ratio Duty described above) according to the control signal CTL for the power transmission. In other words, the ON/OFF operation of the switching element SW is controlled using the control signal CTL supplied from the control section 114. Thus, the AC signal Sac (AC power) may be generated based on a DC current signal Sdc inputted from the external power source 9, for example, and the generated AC signal Sac may be supplied to the LC resonance circuit 112S and the power transmission section 110 (the LC resonance circuit 112P).

(LC Resonance Circuit 112S)

The LC resonance circuit 112S is configured using the coil L1s and the capacitor C1s as described above, and the coil L1s and the capacitor C1s are electrically connected to each other in series. In other words, the LC resonance circuit 112S functions as a series LC resonance circuit. Specifically, one end of the coil L1s is connected to the AC signal generating circuit 111 side, and the other end thereof is connected to one end of the capacitor C1s. The other end of the capacitor C1s is connected to the LC resonance circuit 112P side. It is to be noted that the LC resonance circuit 112S is also set so that a Q value is relatively higher.

Here, unlike the above-described LC resonance circuit 112P, the LC resonance circuit 112S is not allowed to be magnetically coupled to other coil such as the power receiving coil L2 (the LC resonance circuit 212). In other words, the LC resonance circuit 112S may form a closed magnetic circuit by using, for example, a toroidal core and/or the like.

(Current Detection Sections 113A and 113B)

The current detection section 113A is provided on a path between the AC signal generating circuit 111 and the LC resonance circuit 112S. The current detection section 113B is provided on a path between the LC resonance circuit 112S and the power transmission section 110 (the LC resonance circuit 112P). The current detection sections 113A and 113B each detect a circuit current flowing upon the power transmission performed by the power transmission section 110, and supply a value of the detected circuit current to the control section 114. Specifically, the current detection section 113A detects a circuit current I1 flowing on the path between the AC signal generating circuit 111 and the LC resonance circuit 112S, and supplies a value of the detected circuit current I1 to the control section 114. Meanwhile, the current detection section 113B detects a circuit current I2 flowing on the path between the LC resonance circuit 112S and the power transmission section 110, and supplies a value of the detected circuit current I2 to the control section 114. Each of the current detection sections 113A and 113B described above may be configured using, for example, a current transformer and/or the like including a resistor. The control section 114 performs the above-described frequency control of the control signal CTL, by using the circuit currents I1 and I2 thus detected.

It is to be noted that, here, the two current detection sections 113A and 113B are provided in the feed unit 1, but, for example, only either one of the current detection sections 113A and 113B may be provided. In other words, in the control section 114, the frequency control may be performed using only one of the detected circuit currents I1 and I2. In addition, the current detection sections 113A and 113B may detect the circuit currents I1 and I2 either as digital values or analog values. In a case of detecting the current as an analog value, for example, a analog-to-digital converter (a A/D converter) may be provided in the control section 114, and the frequency control may be performed after converting the circuit current I1 or I2 formed of the detected analog value into a digital value.

(Power Receiving Section 210 and LC Resonance Circuit 212)

The power receiving section 210 includes the power receiving coil L2 used to receive the electric power transmitted from the power transmission section 110 (from the alternating magnetic field), and the capacitor C2 used to form the above-described LC resonance circuit 212 together with the power receiving coil L2. The power receiving coil L2 and the capacitor C2 are electrically connected to each other in series, and the LC resonance circuit 212 functions as a series LC resonance circuit. Specifically, one end of the capacitor C2 is connected to one input terminal in the rectifier circuit 211, and the other end of the capacitor C2 is connected to one end of the power receiving coil L2. The other end of the power receiving coil L2 is connected to the other input terminal in the rectifier circuit 211.

The LC resonance circuit 212 that includes the power receiving coil L2 and the capacitor C2 and the LC resonance circuit 112P that includes the power transmission coil L1p and the capacitor C1p described above are magnetically coupled to each other. Thus, the LC resonance operation that is based on the resonant frequency substantially equal to the high-frequency electric power (the AC signal Sac) generated by the AC signal generating circuit 111 is performed.

(Rectifier Circuit 211)

Here, the rectifier circuit 211 is configured using four rectifier elements (diodes) D1 to D4. In this example of FIG. 3, an anode of the rectifier element D1 and a cathode of the rectifier element D3 are connected to the one input terminal in the rectifier circuit 211, and a cathode of the rectifier element D1 and a cathode of the rectifier element D2 are connected to an output terminal in the rectifier circuit 211. Further, an anode of the rectifier element D2 and a cathode of the rectifier element D4 are connected to the other input terminal in the rectifier circuit 211, and an anode of the rectifier element D3 and an anode of the rectifier element D4 are grounded. In the rectifier circuit 211 having such a configuration, the AC power supplied from the power receiving section 210 is rectified, and the received electric power formed of the DC power is supplied to the charging circuit 213. It is to be noted that the rectifier circuit 211 may be a synchronous rectification circuit using a transistor.

(Charging Circuit 213)

The charging circuit 213 is, as described above, the circuit that charges the battery 214 based on an output voltage (DC power) supplied from the rectifier circuit 211. Here, the charging circuit 213 is provided between the rectifier circuit 211 and the load 22.

[Functions and Effects of Feed System 4]

(1. Outline of Overall Operation)

In this feed system 4, the predetermined high-frequency electric power (the AC signal Sac) used to perform the electric power transmission is supplied by the AC signal generating circuit 111 in the feed unit 1, to the power transmission coil L1, the capacitor C1p (the LC resonance circuit 112P), and the like in the power transmission section 110, based on the electric power supplied from the external power source 9. This causes the magnetic field (the magnetic flux) in the power transmission coil L1p in the power transmission section 110. At this moment, when the electronic devices 2A and 2B each serving as the device to be fed (the device to be charged) are placed on (or, in proximity to) the top surface (the feeding surface S1) of the feed unit 1, the power transmission coil L1p in the feed unit 1 and the power receiving coil L2 in each of the electronic devices 2A and 2B are in proximity to each other in the vicinity of the feeding surface S1.

In this way, when the power receiving coil L2 is placed in proximity to the power transmission coil L1p generating the magnetic field (the magnetic flux), an electromotive force (induced electromotive force) is generated in the power receiving coil L2 by being induced by the magnetic flux generated by the power transmission coil L1p. In other words, due to electromagnetic induction or magnetic resonance, the magnetic field is generated by forming interlinkage with each of the power transmission coil L1p and the power receiving coil L2. As a result, electric power is transmitted from the power transmission coil L1p side (a primary side, the feed unit 1 side, or the power transmission section 110 side) to the power receiving coil L2 side (a secondary side, the electronic devices 2A and 2B side, or the power receiving section 210 side) (see the arrow P1 in FIG. 2 and FIG. 3). At this moment, the power transmission coil L1p on the feed unit 1 side and the power receiving coil L2 on each of the electronic devices 2A and 2B side are magnetically coupled to each other by electromagnetic induction or the like, and the LC resonance operation is performed in the LC resonance circuits 112P and 212, and the like.

Then, in each of the electronic devices 2A and 2B, the AC power received by the power receiving coil L2 is supplied to the rectifier circuit 211 and the charging circuit 213, and the following charging operation is performed. That is, after this AC power is converted into predetermined DC power by the rectifier circuit 211, the charging of the battery 214 based on this DC power is performed by the charging circuit 213. In this way, in each of the electronic devices 2A and 2B, the charging operation based on the electric power received by the power receiving section 210 is performed.

In other words, in the present embodiment, at the time of charging the electronic devices 2A and 2B, terminal connection to an AC adapter or the like, for example, is unnecessary, and it is possible to start the charging easily by merely placing the electronic devices 2A and 2B on (or in proximity to) the feeding surface S1 of the feed unit 1 (non-contact feeding is performed). This reduces burden on a user.

Figure 5:
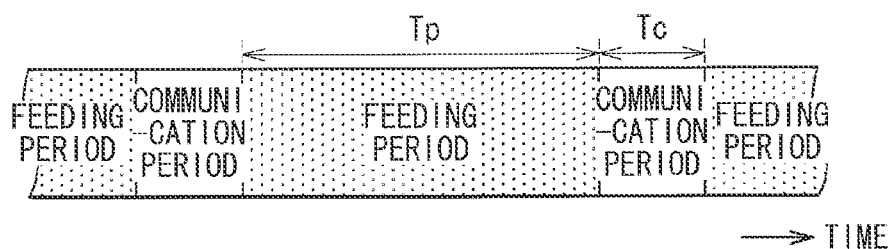
FIG. 5 is a timing chart illustrating an example of a feeding period and a communication period.

In addition, as illustrated in, for example, FIG. 5, during such feeding operation, a feeding period Tp and a communication period Tc are time-divisionally provided periodically (or aperiodically). In other words, the control section 114 performs the control to set the feeding period Tp and the communication period Tc time-divisionally and periodically (or aperiodically). Here, the communication period Tc is a period used to perform, between the primary-side device (the feed unit 1) and the secondary-side device (the electronic devices 2A and 2B), the mutual communication operation (communication operation for authentication, feeding efficiency control, and the like with respect to each other) using the power transmission coil L1p and the power receiving coil L2 (see the arrow C1 in FIG. 2 and FIG. 3). It is to be noted that the time ratio between the feeding period Tp and the communication period Tc at this moment may be, for example, about 9:1.

Here, during the communication period Tc, the communication operation using the pulse width modulation in the AC signal generating circuit 111, for example, may be performed. Specifically, the communication based on the pulse width modulation is performed by setting the duty ratio Duty of the control signal CTL in the communication period Tc, based on predetermined modulation data. It is to be noted that it is difficult in principle to perform the frequency modulation during the above-described resonance operation in the power transmission section 110 and the power receiving section 210. Therefore, the communication operation is readily realized by using such a pulse width modulation.

(2. Functions of LC Resonance Circuits 112S and 112P)

Meanwhile, in such a non-contact feed system using magnetic coupling or magnetic resonance by an alternating magnetic field, occurrence of noise, heat, and the like due to harmonics of a fundamental frequency in the alternating magnetic field is an issue. Heat or the like caused by the fundamental wave depends on the magnitude of a load and thus, electric capacity of a circuit may be adjusted in a design phase. However, it is not easy to realize a solution to the heat caused by the harmonics, because this solution is favorable to be provided on condition that a solution for the fundamental wave is sufficient. Thus, not to mention the harmonics becoming a noise source of unnecessary radiation, due to the entire circuit being configured assuming the frequency of the fundamental wave, energy loss (heat generation), a decline in power transmission efficiency due to the harmonics, etc. are likely to be caused unless the harmonics are dealt with appropriately.

It is to be noted that examples of a main factor for occurrence of the harmonics in such a non-contact feed system include the following (A) to (C).
(A) A waveform distortion due to switching operation in a DC/AC converter and the like
(B) A waveform distortion due to magnetic saturation of a magnetic substance (such as ferrite)
(C) A waveform distortion due to a non-linear load In addition, examples of a point generating heat due to occurred harmonics include the following (D) and (E).
(D) DC/AC converter (here, for example, the AC signal generating circuit 111)
(E) Power transmission coil (here, for example, the power transmission coil L1p)

Thus, in the feed unit 1 of the present embodiment, the circuit configuration in which the series LC resonance circuit and the parallel LC resonance circuit are combined is provided in the feed unit 1 in order to suppress the above-described occurrence of noise and heat attributable to the harmonics. In other words, both the LC resonance circuit 112S (the series LC resonance circuit) and the LC resonance circuit 112P (the parallel LC resonance circuit) are provided in the feed unit 1. In addition, the power transmission coil L1p is included on the LC resonance circuit 112P side, and not on the LC resonance circuit 112S side.

Here, the LC resonance circuit 112S functions as the series LC resonance circuit. Therefore, the LC resonance circuit 112S exhibits such frequency characteristics that the amount of a flowing circuit current is greatest in the neighborhood of the frequency of the fundamental wave, as will be described later in detail (FIG. 6A). In other words, in a domain of harmonics having any frequency other than this frequency, the coil L1s exhibits high impedance and thus, a circuit current does not flow well even if it is favorable to flow more. In other words, in the domain of the harmonics, the coil L1s exhibits a light-load condition. Therefore, in the LC resonance circuit 112S, adverse effects (such as occurrence of noise and heat) due to the harmonics attributable to the occurrence factor (A) described above are mainly suppressed.

On the other hand, the LC resonance circuit 112P forms the parallel LC resonance circuit by using the power transmission coil L1p, as described above. Therefore, even when, for example, the load 22 exhibits non-linear characteristics (the load 22 is a non-linear load), the LC resonance circuit 112P may not be affected by such non-linear characteristics on the feed unit 1 side. Some reasons for this are as follows. As will be described later in detail (FIG. 6B), frequency characteristics in the parallel LC resonance circuit is such characteristics that a circuit current becomes most difficult to flow at frequencies in the neighborhood of the fundamental wave, contrary to the case of the series LC resonance circuit described above. In other words, as for a waveform distortion due to harmonics, impedance is low in a case of parallel resonance, and thus, distortion of a waveform is less likely to occur even when a load is non-linear. Therefore, in the LC resonance circuit 112P, adverse effects (such as occurrence of noise and heat) due to the harmonics attributable to the occurrence factor (C) described above are mainly suppressed.

(3. Control Operation of Control Signal CTL by Control Section 114)

Further, in the feed unit 1 of the present embodiment, the control operation (the frequency control and the duty-ratio control) for the control signal CTL provided to control the operation of the AC signal generating circuit 111 is performed in the control section 114. The frequency control and the duty-ratio control will be described below in detail.

(3-1. Frequency Control of Control Signal CTL)

First, the frequency control of the control signal CTL (dynamic control of the above-mentioned CTL (f)) by the control section 114 will be described.

Here, first, as illustrated in, for example, FIG. 6A, when an LC resonance circuit performs series resonance, in general, the following frequency characteristics are exhibited. That is, the amount of a flowing current (a circuit current) is greatest in the neighborhood of a resonant frequency fr (a frequency of a fundamental wave) in the LC resonance circuit. In other words, the circuit current exhibits frequency characteristics having a convex shape in a frequency domain in the vicinity of the resonant frequency fr. It is to be noted that, this resonant frequency fr is substantially equal to a frequency f1 (CTL(f)=f1) of the control signal CTL described here.

In addition, as illustrated in, for example, FIG. 6B, when an LC resonance circuit performs parallel resonance, in general, the following frequency characteristics are exhibited. That is, the amount of a flowing circuit current is smallest in the neighborhood of the resonant frequency fr (the frequency of the fundamental wave) in the LC resonance circuit. In a frequency domain except for that domain (a frequency domain of harmonics), the LC resonance circuit exhibits a short-circuited state. In other words, a circuit current exhibits frequency characteristics having a concave shape in a frequency domain in the neighborhood of the resonant frequency fr. It is to be noted that the resonant frequency fr is substantially equal to the frequency f1 (CTL(f)=f1) of the control signal CTL described here, in this case as well.

On the other hand, when both the series LC resonance circuit (the LC resonance circuit 112S) and the parallel LC resonance circuit (the LC resonance circuit 112P) are provided to be combined at the resonant frequencies fr substantially equal to each other as in the feed unit 1 of the present embodiment, frequency characteristics as illustrated in, for example, FIG. 6C are exhibited. In other words, the circuit current has a local maximum value (or a maximum value) at each of two different frequencies fp1 and fp2, and the circuit current has a local minimum value (or a minimum value) in the neighborhood of the resonant frequency fr (the frequency of the fundamental wave) positioned between the frequencies fp1 and fp2. That is, the resonant frequency fr is located in the neighborhood of a valley (bottom) in a V-shaped frequency characteristics. It is to be noted that the resonant frequency fr is substantially equal to the frequency f1 (CTL(f)=f1) of the control signal CTL in this case as well.

Here, in a non-contact feed system such as the feed system 4 of the present embodiment, the frequency characteristics of the circuit current as illustrated in FIG. 6C is not constant, and varies, unlike a transformer or the like. For instance, the frequency characteristics of the circuit current may vary due to factors such as variations in characteristics (electrical characteristics) among elements (such as coils) and variation in magnitude of a load. Specifically, as indicated by, for example, an arrow of a solid line in FIG. 6C, the circuit current increases in the neighborhood of the resonant frequency fr as the load increases, while the circuit current in the neighborhood of the resonant frequency fr decreases as the load decreases.

Thus, the control section 114 of the present embodiment performs the frequency control of the control signal CTL, in the following manner. The control section 114 performs the frequency control of the control signal CTL so that a circuit current flowing upon the power transmission (a current flowing through the ower transmission coil L1p and the like) becomes small (preferably, smallest). Specifically, as illustrated in, for example, FIG. 6C, the frequency (CTL(f)=f1) of the control signal CTL is controlled so that the circuit current becomes small in a frequency domain in the neighborhood of the resonant frequency fr during the resonance operation performed by combining the series LC resonance circuit (the LC resonance circuit 112S) and the parallel LC resonance circuit (the LC resonance circuit 112P).

Figure 7:
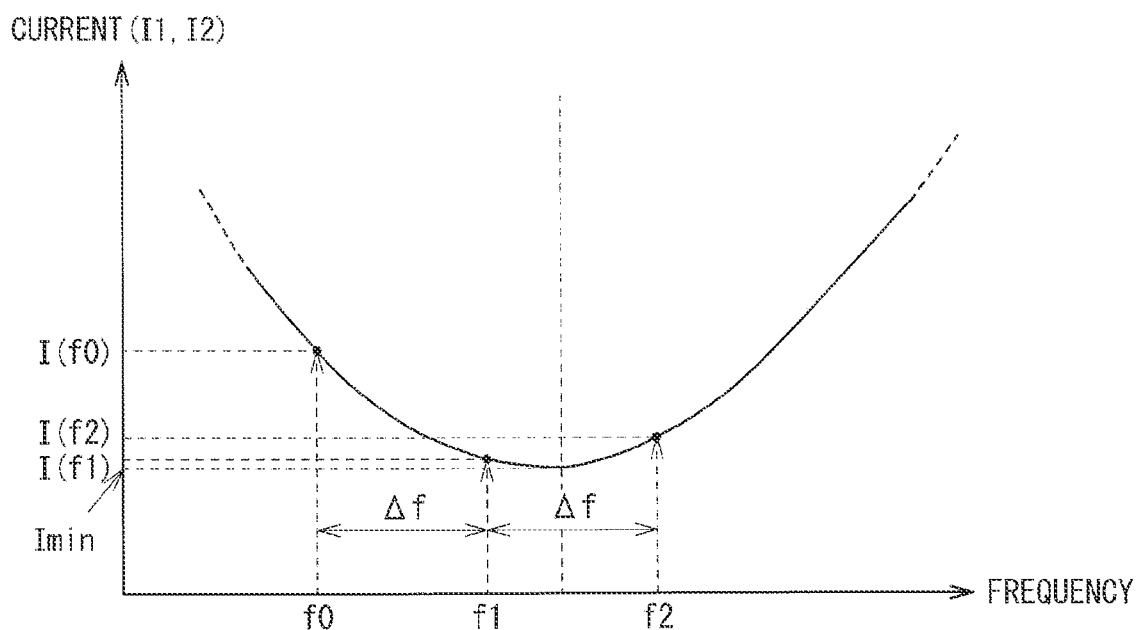
FIG. 7 is a schematic diagram used to describe outline of frequency control according to the embodiment.

To be more specific, as illustrated in, for example, FIG. 7, the control section 114 performs the frequency control so that the circuit current (here, the circuit currents I1 and I2 detected by the current detection sections 113A and 113B, respectively) is substantially a local minimum current value Imin (or substantially a minimum current value), or preferably, the local minimum current value Imin (or the minimum current value). It is assumed here that, concerning the frequency characteristics of the circuit currents I1 and I2 illustrated in FIG. 7, the present frequency (a setting frequency) of the control signal CTL is f1, a frequency determined by subtracting a predetermined frequency Δf from this present frequency f1 is f0 (=f1−Δf), and a frequency determined by adding this frequency Δf to the present frequency f1 is f2 (=f1+Δf). Further, the circuit current (each of I1 and I2) at the time when the frequency of the control signal CTL is f0, f1, and f2 is assumed to be I(f0), I(f1), and I(f2), respectively.

In this case, the control section 114 performs the frequency control (dynamic control of the frequency f1) by updating the frequency (the present frequency f1) of the control signal CTL whenever necessary, according to a relative magnitude correlation between the circuit currents I(f0), I(f1), and I(f2).

Figure 8:
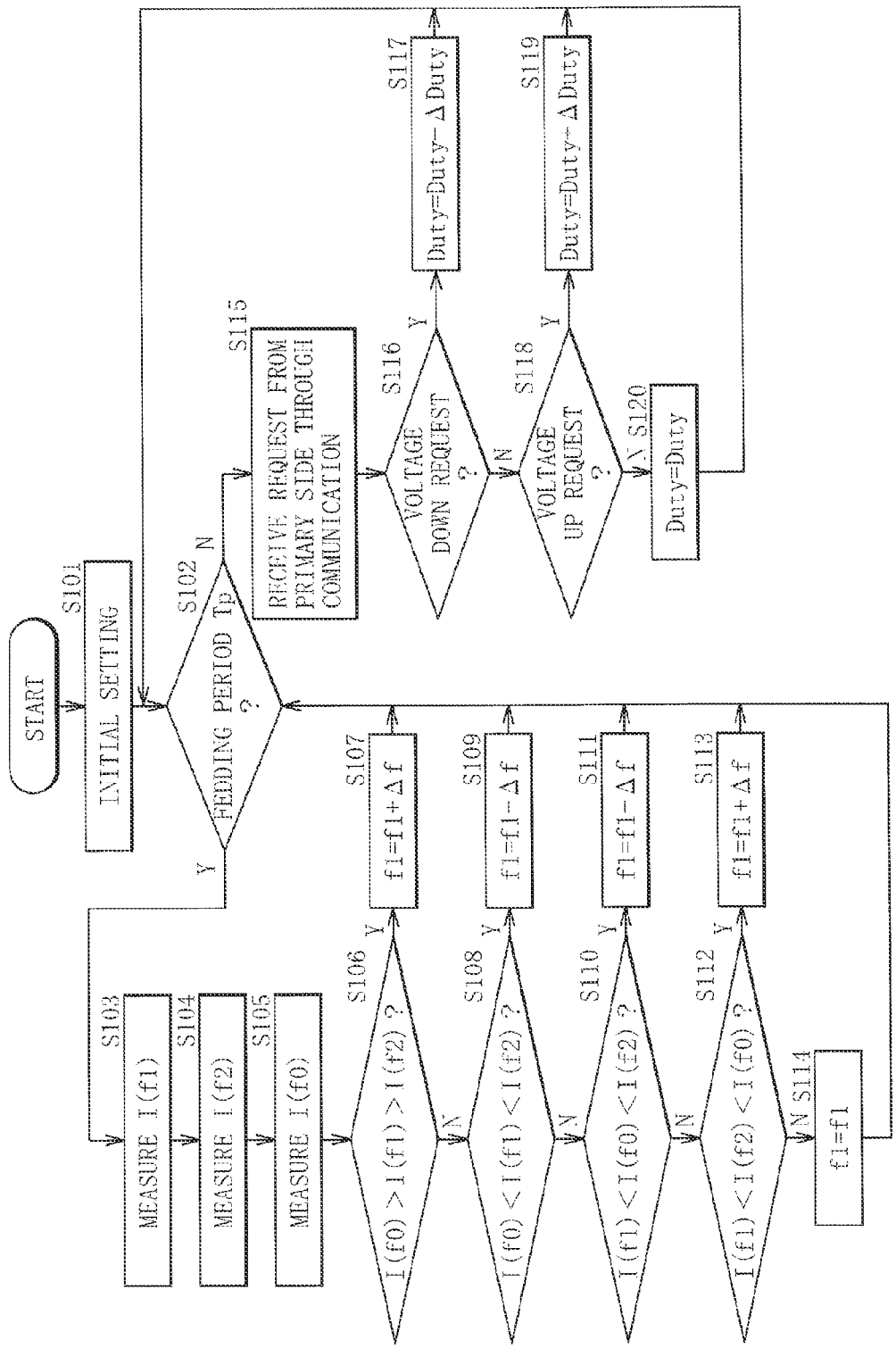
FIG. 8 is a flowchart illustrating an example of the frequency control and duty-ratio control according to the embodiment.

FIG. 8 illustrates an example of specific frequency control and (the duty-ratio control which will be described later) by the control section 114, in a flowchart. In this example, at first, the control section 114 performs initial setting of various parameters (such as the present frequency f1, the above-described frequency Δf, and the duty ratio Duty) of the control signal CTL (step S101 in FIG. 8). Next, the control section 114 determines whether it is the feeding period Tp at present, in the time-divisional setting of the feeding period Tp and the communication period Tc as illustrated in, for example, FIG. 5 (step S102). Here, when determining that it is not the feeding period Tp at present (it is the communication period Tc) (step S102: N), the control section 114 then performs the duty-ratio control of the control signal CTL which will be described later (steps S115 to S120).

On the other hand, when determining that it is the feeding period Tp at present (step S102: Y), the control section 114 then performs the frequency control of the control signal CTL (steps S103 to S114) which will be described below. Specifically, at first, the current detection sections 113A and 113B perform detection (the measurement) of the circuit currents I1 and I2, in the state in which the frequency of the control signal CTL is set at the above-described f1, f2, and f0. Thus, the control section 114 acquires the value of each of the circuit currents I(f1), I(f2), and I(f0) described above (steps S103, S104, and S105).

Figure 9:
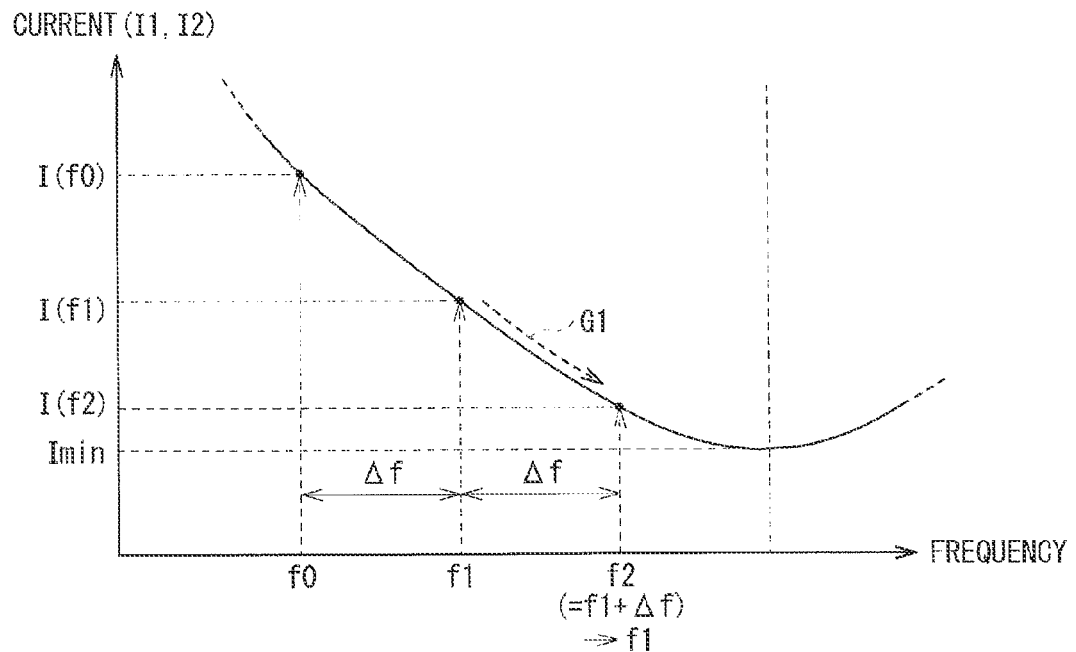
FIG. 9 is a schematic diagram illustrating an example of specific control in the frequency control illustrated in FIG. 8.

Next, the control section 114 determines whether the circuit currents I(f1), I(f2), and I(f0) satisfy the following conditional expression (1) (step S106). In other words, the control section 114 determines whether each of the circuit currents I1 and I2 has frequency characteristics indicating monotone decreasing, in a frequency domain from f0 to f1, as illustrated in, for example, FIG. 9. Here, when determining that the conditional expression (1) is satisfied (each of the circuit currents I1 and I2 has the frequency characteristics indicating monotone decreasing) (step S106: Y), the control section 114 then performs the frequency control by updating the present frequency f1 in the control signal CTL. Specifically, the present frequency f1 is updated to the value of the frequency f2 (=f1+Δf) (f1=f1+Δf), as indicated by, for example, an arrow G1 in FIG. 9 (step S107). It is to be noted that, afterwards, the flow returns to step S102 described above.

$$I(f0) > I(f1) > I(f2) \quad (1)$$

Figure 10:
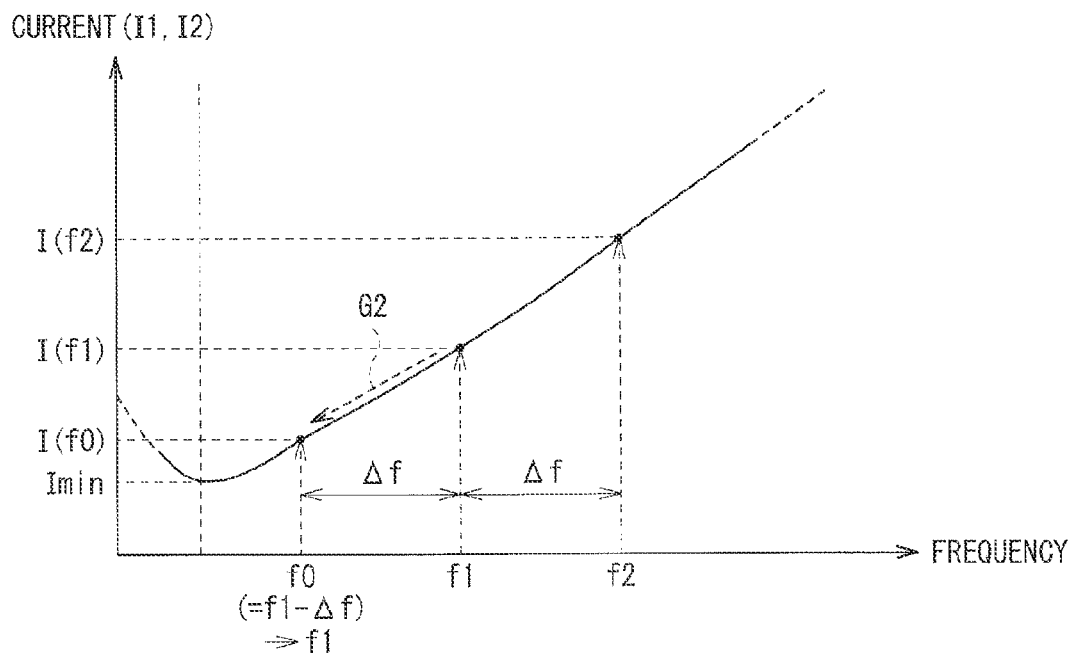
FIG. 10 is a schematic diagram illustrating another example of specific control in the frequency control illustrated in FIG. 8.

On the other hand, when determining that the conditional expression (1) is not satisfied (each of the circuit currents I1 and I2 does not have the frequency characteristics indicating monotone decreasing) (step S106: N), the control section 114 determines whether the following conditional expression (2) is satisfied (step S108). In other words, it is determined whether each of the circuit currents I1 and I2 has a frequency characteristics indicating monotone increasing, in the frequency domain from f0 to f1, as illustrated in, for example, FIG. 10. Here, when determining that the conditional expression (2) is satisfied (each of the circuit currents I1 and I2 has the frequency characteristics indicating monotone increasing) (step S108: Y), the control section 114 then performs the frequency control by updating the present frequency f1 of the control signal CTL. Specifically, the present frequency f1 is updated to the value of the frequency f0 (=f1−Δf) (f1=f1−Δf), as indicated by, for example, an arrow G2 in FIG. 10 (step S109). It is to be noted that, afterwards, the flow returns to step S102 described above.

$$I(f0)<I(f1)<I(f2) \qquad (2)$$

Figure 11:
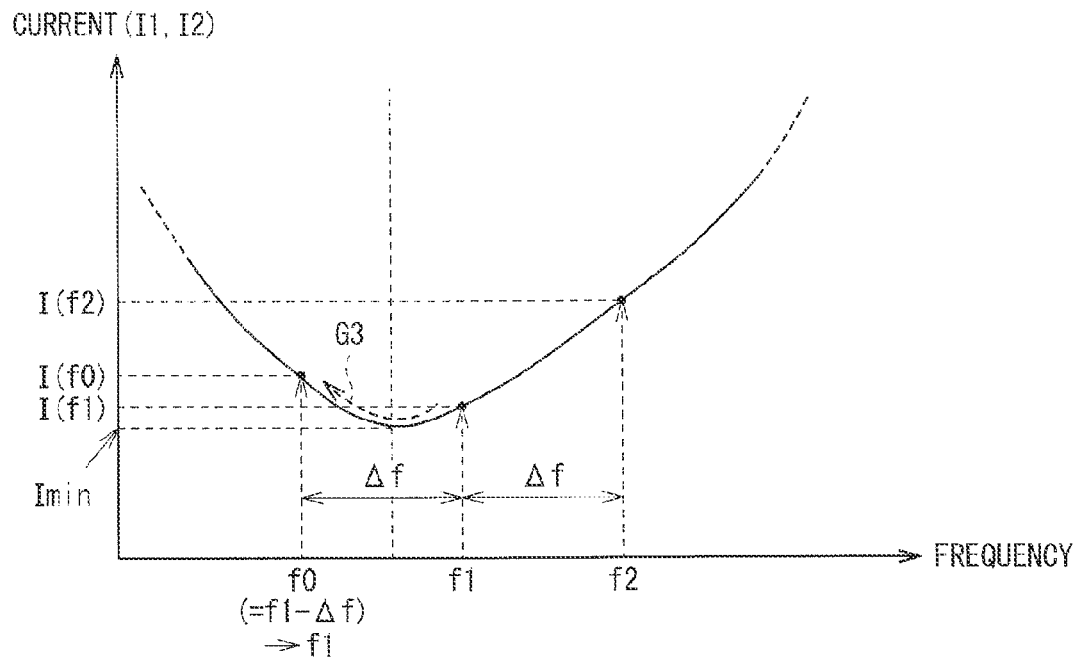
FIG. 11 is a schematic diagram illustrating still another example of specific control in the frequency control illustrated in FIG. 8.

On the other hand, when determining that the conditional expression (2) is not satisfied (each of the circuit currents I1 and I2 does not have the frequency characteristics indicating monotone increasing) (step S108: N), the control section 114 then determines whether the following conditional expression (3) is satisfied (step S110). In other words, it is determined whether each of the circuit currents I1 and I2 has frequency characteristics indicating a local minimum current value (or a minimum current value) Imin between the frequencies f0 and f1, in the frequency domain from f0 to f1, as illustrated in, for example, FIG. 11. Here, when determining that the conditional expression (3) is satisfied (each of the circuit currents I1 and I2 has the frequency characteristics indicating the local minimum current value Imin between the frequencies f0 and f1) (step S110: Y), the control section 114 then performs the frequency control by updating the present frequency f1 of the control signal CTL. Specifically, the present frequency f1 is updated to the value of the frequency f0 (=f1−Δf) (f1=f1−Δf), as indicated by, for example, an arrow G3 in FIG. 11 (step S111). It is to be noted that, afterwards, the flow returns to step S102 described above.

$$I(f1)<I(f0)<I(f2) \qquad (3)$$

Figure 12:
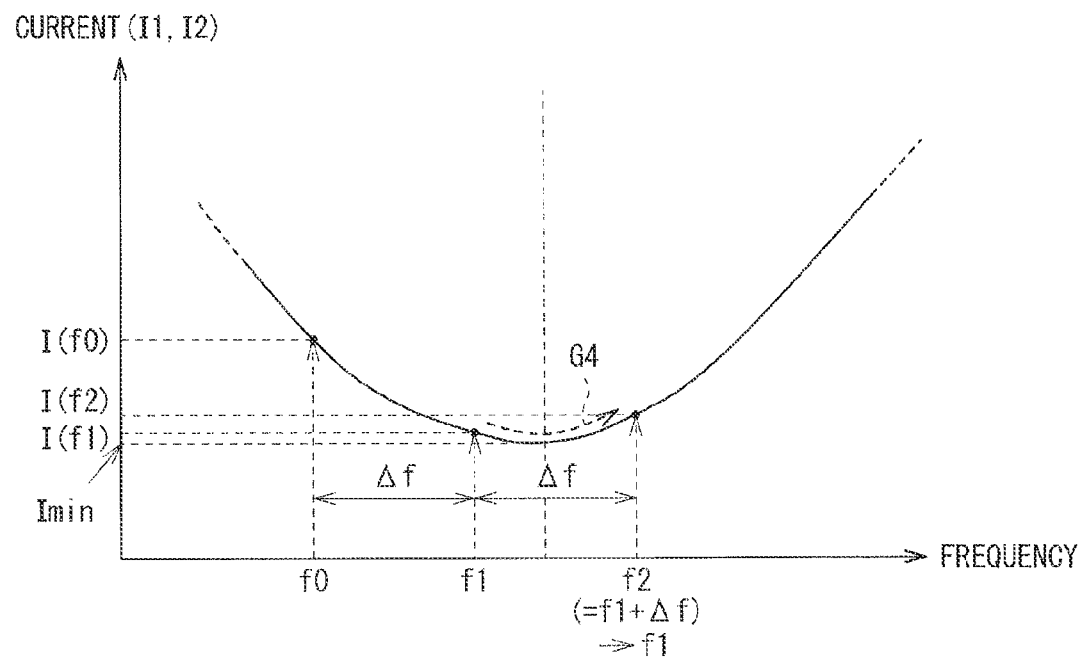
FIG. 12 is a schematic diagram illustrating still another example of specific control in the frequency control illustrated in FIG. 8.

On the other hand, when determining that the conditional expression (3) is not satisfied (each of the circuit currents I1 and I2 does not have the frequency characteristics indicating the local minimum current value Imin between the frequencies f0 and f1) (step S110: N), the control section 114 then determines whether the following conditional expression (4) is satisfied (step S112). In other words, it is determined whether each of the circuit currents I1 and I2 has the frequency characteristics indicating the local minimum current value (or the minimum current value) Imin between the frequencies f1 and f2, in the frequency domain from f0 to f1, as illustrated in, for example, FIG. 12. Here, when determining that the conditional expression (4) is satisfied (each of the circuit currents I1 and I2 has the frequency characteristics indicating the minimal current value Imin between the frequencies f1 and f2) (step S112: Y), the control section 114 then performs the frequency control by updating the present frequency f1 of the control signal CTL. Specifically, the present frequency f1 is updated to the value of the frequency f2 (=f1+Δf) (f1=f1+Δf), as indicated by, for example, an arrow G4 in FIG. 12 (step S113). It is to be noted that, afterwards, the flow returns to step S102 described above.

$$I(f1)<I(f2)<I(f0) \qquad (4)$$

It is to be noted that when there is substantially no difference between the respective values of the circuit currents I(f0), I(f1), and I(f2), in the above-described conditional expressions (3) and (4), for example, updating the value of the present frequency f1 may be omitted. Further, for example, when a difference in the relative magnitude correlation between the circuit currents I(f1), I(f2), and I(f0) is extremely small (shrunk), the value of the above-described predetermined frequency Δf may be varied to be small. Conversely, when the difference in the relative magnitude correlation between the circuit currents I(f1), I(f2), and I(f0) is extremely large (widened), the value of the above-described predetermined frequency Δf may be varied to be large.

In this way, in the present embodiment, the frequency control of the control signal CTL for the AC signal generating circuit 111 is performed so that the circuit currents I1 and I2 flowing during the power transmission become small. Thus, even when the frequency characteristics of each of the circuit currents I1 and I2 are varied in accordance with variation in characteristics among elements, variation in a load, and the like, the circuit currents I1 and I2 are easily suppressed to a low level, which enhances the transmission efficiency in the power transmission.

It is to be noted that, as described above, the power transmission coil L1$p$ is included in the parallel LC resonance circuit (the LC resonance circuit 112P) and therefore, an influence of the waveform distortion due to the non-linear load is not easily transmitted to a circuit in the feed unit 1. It is possible to say that this also contributes to the enhancement of the power transmission efficiency.

(3-2. Duty-Ratio Control of Control Signal CTL)

Next, the duty-ratio control (dynamic control of the above-described CTL (Duty)) of the control signal CTL by the control section 114 will be described with reference to FIG. 8 and FIG. 13. First, the control section 114 controls the duty ratio Duty of the control signal CTL, by utilizing communication with the electronic devices 2A and 2B described above. Specifically, the control section 114 receives a request for an electromotive force value (e.g. an average value Vave of an induced electromotive force which will be described later) in each of the electronic devices 2A and 2B, by utilizing the communication with the electronic devices 2A and 2B, and controls the duty ratio Duty of the control signal CTL in response to the request for the electromotive force value.

Figure 13:
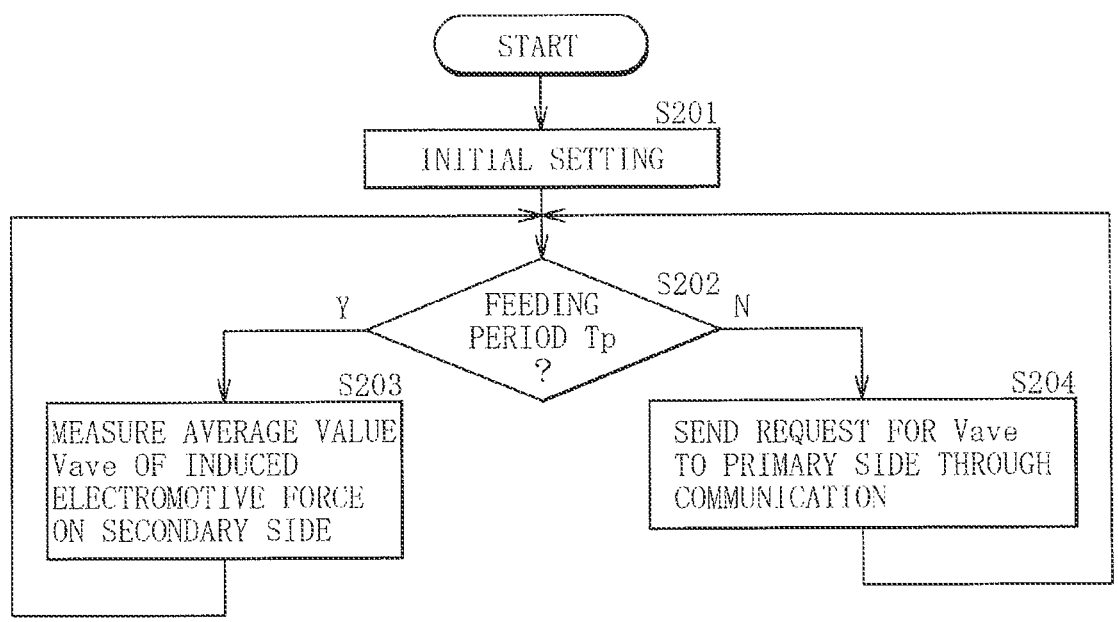
FIG. 13 is a flowchart illustrating an example of operation of requesting an electromotive force value by utilizing communication in a secondary-side device.

To be more specific, first, each of the electronic devices 2A and 2B transmits the request for the electromotive force value (here, the average value Vave of the induced electromotive force) to the feed unit 1 by utilizing the above-described communication, as illustrated in a flowchart in FIG. 13, for example. In other words, in the example illustrated in this FIG. 13, at first, each of the electronic devices 2A and 2B (for example, a control section which is not illustrated) performs initial setting of the induced electromotive force (step S201 in FIG. 13).

Next, each of the electronic devices 2A and 2B determines whether it is the feeding period Tp at present, in the timi-divisional setting of the feeding period Tp and the communication period Tc as illustrated in, for example, FIG. 5 (step S202). Here, when determining that it is the feeding period Tp at present (step S202: Y), each of the electronic devices 2A and 2B (for example, a voltage detecting section which is not illustrated) then measures and detects the average value Vave of the induced electromotive force (step S203). It is to be noted that afterwards, the flow returns to step S202.

On the other hand, when determining that it is not the feeding period Tp at present (it is the communication period Tc) (step S202: N), each of the electronic devices 2A and 2B (e.g. the power receiving section 210) transmits the request for the electromotive force value (Vave) to the feed unit 1, by utilizing the above-described communication (step S204). It is to be noted that afterwards, the flow returns to step S202.

Here, when there is such a request for the electromotive force value from the electronic devices 2A and 2B during the communication period Tc, the control section 114 in the feed unit 1 performs the duty-ratio control of the control signal CTL in a manner described below (steps S115 to S120 in FIG. 8). Specifically, first, the control section 114 receives the request for the electromotive force value (Vave) from the electronic devices 2A and 2B, by utilizing the above-described communication (step S115).

Next, the control section 114 determines whether the received request is a request for a decrease in the electromotive force value (Vave) (a voltage down request) (step S116). When determining that the received request is the voltage down request (step S116: Y), the control section 114 then performs control of decreasing the duty ratio Duty by updating the present duty ratio Duty of the control signal CTL. Specifically, the control section 114 updates the present duty ratio Duty to a value of (Duty−ΔDuty) (Duty=Duty−ΔDuty) (step S117). As a result, an electromotive force value to be generated in the electronic devices 2A and 2B in the next transmission decreases as requested. It is to be noted that afterwards, the flow returns to step S102.

On the other hand, when determining that the received request is not the voltage down request (step S116: N), the control section 114 then determines whether the received request is a request for an increase in the electromotive force value (Vave) (a voltage up request) (step S118). When determining that the received request is the voltage up request (step S118: Y), the control section 114 then performs control of increasing the duty ratio Duty by updating the present duty ratio Duty of the control signal CTL. Specifically, the control section 114 updates the present duty ratio Duty to a value of (Duty+ΔDuty) (Duty=Duty+ΔDuty) (step S119). As a result, an electromotive force value to be generated in the electronic devices 2A and 2B in the next transmission increases as requested. It is to be noted that afterwards, the flow returns to step S102.

On the other hand, when determining that the received request is not the voltage up request (step S118: N) either, the control section 114 then maintains the present setting, without updating the present duty ratio Duty of the control signal CTL (Duty=Duty) (step S120). As a result, an electromotive force value to be generated in the electronic devices 2A and 2B in the next transmission remains as it is, as requested. It is to be noted that afterwards, the flow returns to step S102.

In this way, in the present embodiment, the duty ratio Duty of the control signal CTL is controlled in the feed unit 1, according to the request for the electromotive force value (Vave) in each of the electronic devices 2A and 2B. Thus, an optimum electromotive force value is set in each of the electronic devices 2A and 2B, so that, for example, a decline in reliability of the electronic devices 2A and 2B attributable to an excessively-large electromotive force value (a decline in reliability due to a factor such as a voltage value exceeding a withstand pressure) may be suppressed.

As described above, in the present embodiment, the frequency control of the control signal CTL for the AC signal generating circuit 111 is performed in the control section 114, so as to make the circuit currents I1 and I2 flowing upon the power transmission become small. Therefore, the circuit currents I1 and I2 are allowed to be readily suppressed to a low level. Therefore, the transmission efficiency upon performing the electric power transmission by using a magnetic field is allowed to be enhanced.

Further, unlike the duty-ratio control, the frequency control alone of the control signal CTL is achievable without performing mutual communication between the feed unit 1 and each of the electronic devices 2A and 2B (without performing some kind of feedback). Therefore, enhancement of the power transmission efficiency is achievable by a relatively simple control method.

Furthermore, since future non-contact feed systems are expected to increase the transmitted electric power, it is possible to support an increase of the transmitted electric power by adopting the above-described configuration of the resonance circuit and suppressing adverse effects such as occurrence of noise and heat attributable to harmonics. Specifically, in general, when the transmitted electric power is increased, adverse effects such as noise and heat caused by harmonics also increase. In contrast, in the configuration (the circuit configuration in which the series LC resonance circuit and the parallel LC resonance circuit including the power transmission coil L1p are combined) of the resonance circuit in the feed unit 1 of the present embodiment, adverse effects such as noise or heat caused due to harmonics are suppressed as described above. Therefore, such adverse effects are allowed to be minimized even when the transmitted electric power is increased, which makes it possible to respond to future expectations such as increases in battery capacity, and applications to the field of electric cars etc.

Modifications

Next, modifications (Modifications 1 and 2) of the above-described embodiment will be described. It is to be noted that the same components as those of the above-described embodiment will be provided with the same reference numerals as those of the above-described embodiment, and the description thereof will be omitted as appropriate.

[Modification 1]

Figure 14:
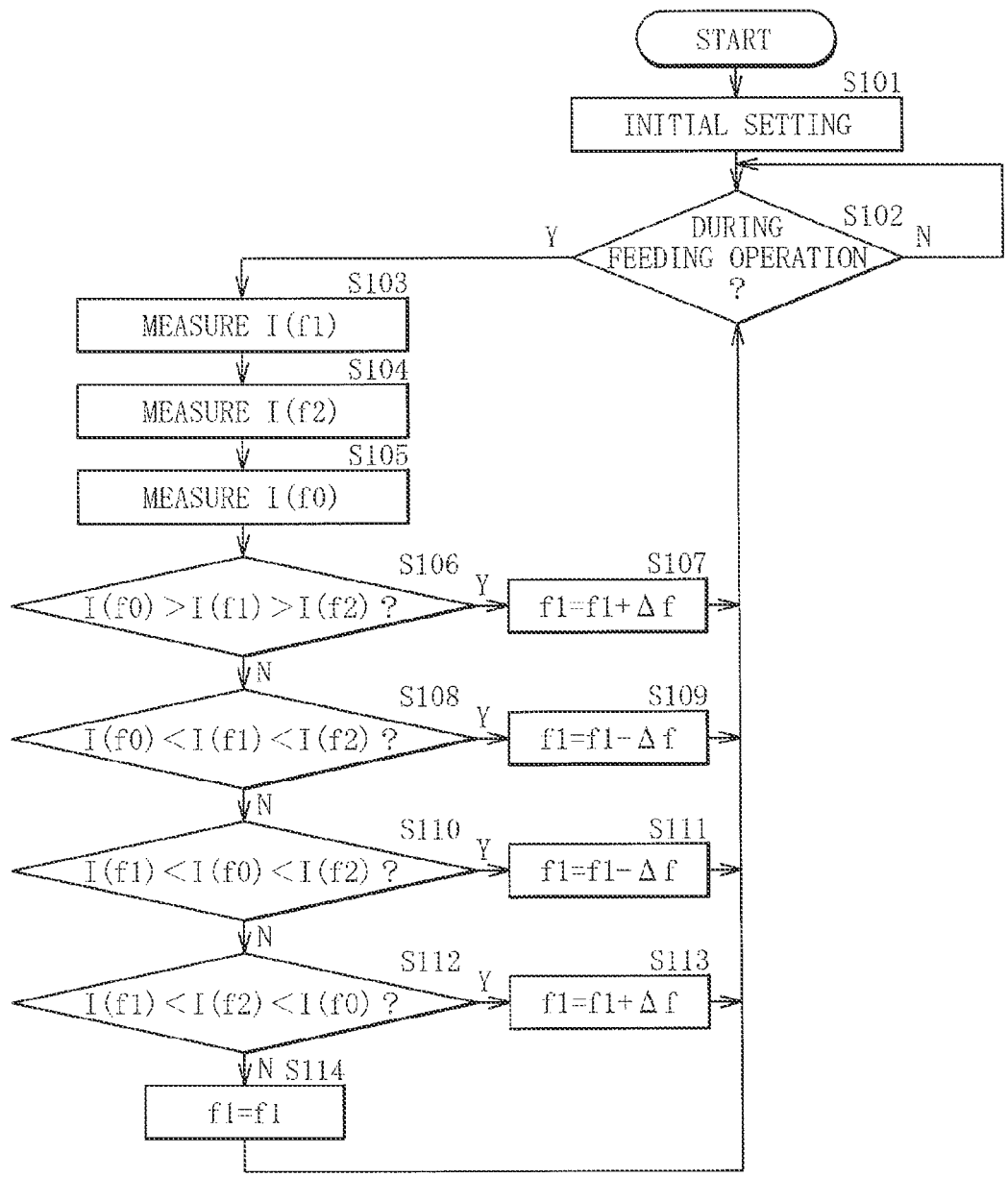
FIG. 14 is a flowchart illustrating an example of frequency control according to Modification 1.

FIG. 14 illustrates an example of frequency control by the control section 114 according to Modification 1, in a flowchart. In the above-described embodiment, the control section 114 performs both the frequency control and the duty-ratio control of the control signal CTL as illustrated in, for example, FIG. 8. In contrast, in the present modification, the control section 114 performs only the frequency control of the control signal CTL as illustrated in, for example, FIG. 14.

In other words, in the present modification, the control section 114 does not perform the duty-ratio control of the control signal CTL (steps S115 to S120) illustrated in FIG. 8, and performs only the frequency control (steps S103 to S114) other than steps S101 and S102 described above. It is to be noted that, in the present modification, since mutual communication between the feed unit 1 and each of the electronic devices 2A and 2B is not performed (the communication period Tc is not provided), the control section 114 determines here whether feeding operation is underway in step S102. Further, when determining that the feeding operation is not underway in this step S102 (step S102: N), the flow comes to step S102 again.

In this way, only the frequency control may be performed, without the duty-ratio control of the control signal CTL being performed in some cases. In this case, since mutual communication between the feed unit 1 and each of the electronic devices 2A and 2B is unnecessary, enhancement of the power transmission efficiency by a simpler control method is achievable.

[Modification 2]

Figure 15A:
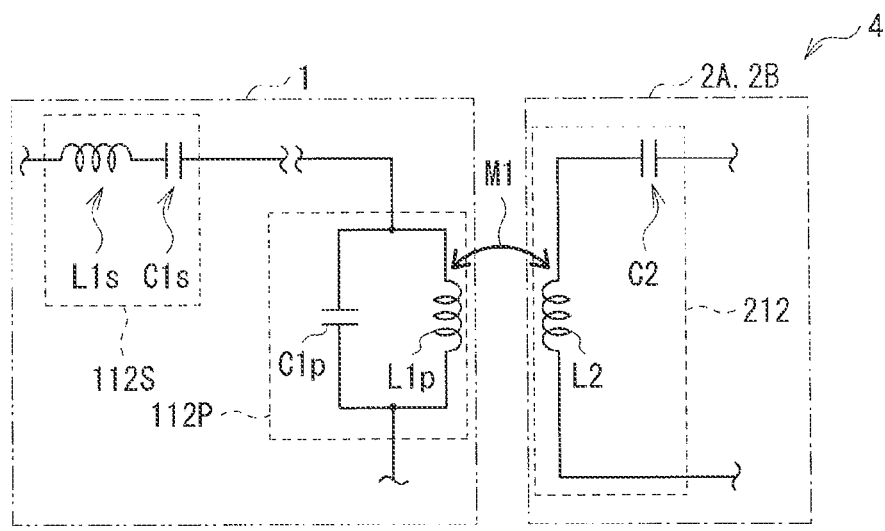
FIGS. 15A and 15B are circuit diagrams each being used to describe a schematic configuration example of a feed system according to Modification 2.
Figure 15B:
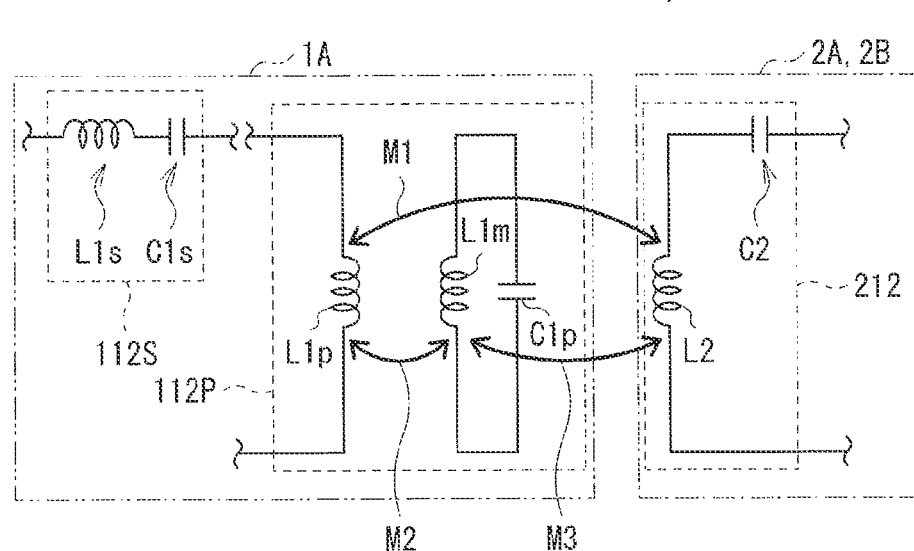

FIG. 15A illustrates a schematic configuration example of the feed system 4 according to the above-described embodiment, in a circuit diagram. FIG. 15B illustrates a schematic configuration example of a feed system (a feed system 4A) according to Modification 2, in a circuit diagram. The feed system 4A of the present modification is equivalent to a system configured by providing a feed unit 1A in place of the feed unit 1 in the feed system 4, and is otherwise similar to the feed system 4 in terms of configuration.

The feed unit 1A is equivalent to a unit configured by further providing an intermediate coil L1m within the LC resonance circuit 112P in the feed unit 1, and is otherwise similar to the feed unit 1 in terms of configuration. The intermediate coil L1m is electrically connected to the capacitor C1p in parallel, and magnetically coupled to each of the power transmission coil L1p and the power receiving coil L2 as illustrated in FIG. 15B (see mutual induction M2 and M3 illustrated in FIG. 15B). This configuration allows the intermediate coil L1m to control an electromotive force value generated in each of the electronic devices 2A and 2B, according to a ratio in winding number between the power transmission coil L1p and the intermediate coil L1m, and functions as a coil for voltage transformation (step-up or step-down).

In the present modification having such a configuration, similar effects by similar functions to those of the above-described embodiment are achievable.

In addition, in the present modification, since the intermediate coil L1m for voltage transformation is provided in the feed unit 1A, the value of electromotive force generated in each of the electronic devices 2A and 2B is controllable. Therefore, it is possible to deal with situations such as a case in which a component for an LC resonance circuit does not have a capacitance value of a capacitor with an appropriate withstand pressure or an inductance having an appropriate value.

It is to be noted that, in the present modification, the control section 114 may perform only the frequency control of the control signal CTL, as in Modification 1.

Other Modifications

The technology of the disclosure has been described with reference to the embodiment and modifications, but is not limited thereto, and may be variously modified.

For example, the description has been provided using various coils (the power transmission coil, and the power receiving coil) in the above-described embodiment and the like, but various kinds of configurations may be used as the configurations (the shapes) of these coils. In other words, each coil may have, for example, a shape such as a spiral shape, a loop shape, a bar shape using a magnetic substance, an α-winding shape in which a spiral coil is folded to be in two layers, a spiral shape having more multiple layers, a helical shape in which a winding is wound in a thickness direction, etc. In addition, each coil may be not only a winding coil configured using a wire rod having conductivity, but also a pattern coil having conductivity and configured using, for example, a printed circuit board, a flexible printed circuit board, etc.

Further, in the above-described embodiment and the like, an electronic device has been described as an example of the device to be fed, but the device to be fed is not limited thereto and may be any type of device to be fed other than electronic devices (e.g. a vehicle such as an electric car).

Furthermore, in the above-described embodiment and the like, each component of the feed unit and the electronic device has been specifically described. However, it is not necessary to provide all the components, or other components may be further provided. For example, a communication function, a function of performing some kind of control, a display function, a function of authenticating a secondary-side device, a function of detecting a mixture such as dissimilar metal, and/or the like may be provided in the feed unit and/or the electronic device.

In addition, the above-described embodiment and the like have been described by taking mainly the case in which the plurality of (two) electronic devices are provided in the feed system as an example. However, the technology is not limited thereto, and only one electronic device may be provided in the feed system.

Moreover, the above-described embodiment and the like have been described by taking the charging tray for the small electronic device (the CE device) such as a portable telephone, as an example of the feed unit. However, the feed unit is not limited to such a home charging tray, and may be applicable to battery chargers of various kinds of electronic devices. In addition, it is not necessarily for the feed unit to be a tray, and may be, for example, a stand for an electronic device such as a so-called cradle.

It is possible to achieve at least the following configurations from the above-described example embodiments and the modifications of the disclosure.

(1) A feed unit including:

a power transmission coil provided to perform power transmission with use of a magnetic field;

a parallel LC resonance circuit including the power transmission coil;

a series LC resonance circuit;

an alternating-current signal generating section supplying the parallel LC resonance circuit and the series LC resonance circuit with an alternating-current signal used to perform the power transmission; and a control section controlling the alternating-current signal generating section with use of a predetermined control signal, the control section performing frequency control of the control signal to allow a circuit current that flows upon the power transmission to become smaller.

(2) The feed unit according to (1), wherein the control section performs the frequency control to allow the circuit current to become smaller in a frequency domain in neighborhood of a resonant frequency during resonance operation in which the series LC resonance circuit and the parallel LC resonance circuit are used in combination.

(3) The feed unit according to (2), wherein the circuit current exhibits concave frequency characteristics in the frequency domain in the neighborhood of the resonant frequency, and the control section performs the frequency control to allow the circuit current to substantially take a local minimum value.

(4) The feed unit according to any one of (1) to (3), wherein when a present frequency of the control signal is f1, a frequency determined by subtracting a predetermined frequency from the f1 is f0, a frequency determined by adding the predetermined frequency to the f1 is f2, the circuit current is I(f0) when the control signal has the frequency of f0, the circuit current is I(f1) when the control signal has the frequency of f1, and the circuit current is I(f2) when the control signal has the frequency of f2, the control section performs the frequency control by updating the f1 whenever necessary in accordance with a relative magnitude relationship between the I(f0), the I(f1), and the I(f2).

(5) The feed unit according to any one of (1) to (4), wherein the control section receives a request for an electromotive force value in an electronic device by utilizing communication between the feed unit and the electronic device, and the control section further has a function of controlling a duty ratio of the control signal in response to the request for the electromotive force value.

(6) The feed unit according to (5), wherein the control section controls the duty ratio to be decreased when receiving a request for a decrease in the electromotive force value, and the control section controls the duty ratio to be increased when receiving a request for an increase in the electromotive force value.

(7) The feed unit according to (5) or (6), wherein a feeding period in which the power transmission to the electronic device is performed and a communication period in which the communication between the feed unit and the electronic device is performed are set time-divisionally.

(8) The feed unit according to any one of (1) to (7), wherein the alternating-current signal generating section includes a switching amplifier including a switching element, and the control section controls ON-and-OFF operation of the switching element with the use of the control signal.

(9) The feed unit according to any one of (1) to (8), further including a current detection section detecting the circuit current, wherein the control section performs the frequency control with use of the circuit current detected by the current detection section.

(10) A feed system including:

one or a plurality of electronic devices, and a feed unit performing power transmission to each of the electronic devices with use of a magnetic field, the feed unit including, a power transmission coil provided to perform the power transmission, a parallel LC resonance circuit including the power transmission coil, a series LC resonance circuit, an alternating-current signal generating section supplying the parallel LC resonance circuit and the series LC resonance circuit with an alternating-current signal used to perform the power transmission, and a control section controlling the alternating-current signal generating section with use of a predetermined control signal, the control section performing frequency control of the control signal to allow a circuit current that flows upon the power transmission to become smaller.

The disclosure contains subject matter related to that disclosed in Japanese Priority Patent Application JP 2012-169217 filed in the Japan Patent Office on Jul. 31, 2012, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A feed unit comprising:

a power transmission coil provided to perform power transmission with use of a magnetic field;

a parallel LC resonance circuit including the power transmission coil;

a series LC resonance circuit;

an alternating-current signal generating section configured to supply the parallel LC resonance circuit and the series LC resonance circuit with an alternating-current signal used to perform the power transmission; and a control section configured to control the alternating-current signal generating section with use of a predetermined control signal, the control section configured to perform frequency control of the control signal to allow a circuit current that flows upon the power transmission to become smaller over a preset range of frequencies in a neighborhood of a resonant frequency of resonance operation.

2. The feed unit according to claim 1, wherein the control section configured to perform the frequency control to allow the circuit current to become smaller in a frequency domain during the resonance operation in which the series LC resonance circuit and the parallel LC resonance circuit are used in combination.

3. The feed unit according to claim 2, wherein the circuit current exhibits concave frequency characteristics in the frequency domain in the neighborhood of the resonant frequency, and the control section is configured to perform the frequency control to allow the circuit current to substantially take a local minimum value.

4. The feed unit according to claim 1, wherein when a present frequency of the control signal is f1, a frequency determined by subtracting a predetermined frequency from the f1 is f0, a frequency determined by adding the predetermined frequency to the f1 is f2, the circuit current is I(f0) when the control signal has the frequency of f0, the circuit current is I(f1) when the control signal has the frequency of f1, and the circuit current is I(f2) when the control signal has the frequency of f2, the control section is configured to perform the frequency control by updating the f1 whenever necessary in accordance with a relative magnitude relationship between the I(f0), the I(f1), and the I(f2).

5. The feed unit according to claim 1, wherein the control section is configured to receive a request for an electromotive force value in an electronic device by utilizing communication between the feed unit and the electronic device, and the control section further has a function of controlling a duty ratio of the control signal in response to the request for the electromotive force value.

6. The feed unit according to claim 5, wherein the control section is configured to control controls the duty ratio to be decreased when receiving a request for a decrease in the electromotive force value, and the control section is configured to control controls the duty ratio to be increased when receiving a request for an increase in the electromotive force value.

7. The feed unit according to claim 5, wherein a feeding period in which the power transmission to the electronic device is performed and a communication period in which the communication between the feed unit and the electronic device is performed are set time-divisionally.

8. The feed unit according to claim 1, wherein the alternating-current signal generating section includes a switching amplifier including a switching element, and the control section is configured to control ON-and-OFF operation of the switching element with the use of the control signal.

9. The feed unit according to claim 1, further comprising a current detection section configured to detect the circuit current, wherein
the control section is configured to perform the frequency control with use of the circuit current detected by the current detection section.

10. A feed system comprising:
one or a plurality of electronic devices, and
a feed unit performing power transmission to each of the electronic devices with use of a magnetic field, the feed unit including,
a power transmission coil provided to perform the power transmission,
a parallel LC resonance circuit including the power transmission coil,
a series LC resonance circuit,
an alternating-current signal generating section configured to supply the parallel LC resonance circuit and the series LC resonance circuit with an alternating-current signal used to perform the power transmission, and
a control section configured to control the alternating-current signal generating section with use of a predetermined control signal, the control section configured to perform frequency control of the control signal to allow a circuit current that flows upon the power transmission to become smaller over a preset range of frequencies in a neighborhood of a resonant frequency of resonance operation.

11. The feed system according to claim 10, wherein the control section is configured to perform the frequency control to allow the circuit current to become smaller in a frequency domain in the neighborhood of the resonant frequency during the resonance operation in which the series LC resonance circuit and the parallel LC resonance circuit are used in combination.

12. The feed system according to claim 10, wherein
the circuit current exhibits concave frequency characteristics in a frequency domain in the neighborhood of the resonant frequency, and
the control section is configured to perform the frequency control to allow the circuit current to substantially take a local minimum value.

* * * * *